(12) United States Patent
Albertson

(10) Patent No.: US 6,290,235 B1
(45) Date of Patent: Sep. 18, 2001

(54) SEALING SYSTEM FOR A RECIPROCATING SHAFT

(75) Inventor: Kenneth R. Albertson, West Valley City, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/041,281

(22) Filed: Mar. 11, 1998

Related U.S. Application Data

(60) Provisional application No. 60/051,531, filed on Jul. 2, 1997.

(51) Int. Cl.[7] .................................................. F16J 15/32
(52) U.S. Cl. ........................ 277/510; 277/552; 277/558
(58) Field of Search .................................. 277/510, 552, 277/558, 566, 569, 584, 436, 438, 439, 928

(56) References Cited

U.S. PATENT DOCUMENTS

| | | |
|---|---|---|
| 2,521,248 | 9/1950 | Parker . |
| 2,907,596 | 10/1959 | Maha . |
| 2,979,350 | 4/1961 | Lansky . |

(List continued on next page.)

FOREIGN PATENT DOCUMENTS

WO 92/15807   2/1992   (EP) .

OTHER PUBLICATIONS

Material entitled "Precision Seals for Hydraulics" of Parker Pradifa GmbH dated Jan., 1993.
Material entitled "Precision Seals for Hydraulics" of Parkrr Hannifin GmbH dated Feb., 1996.
Article entitled "A New Sealing System" from Ken Albertston of Parker Hannifin Corporation Packing Division dated Dec. 19, 1996.
Page from Off–Highway Magazine dated Jan., 1995, showing article of Richard Swanson, Product Engineer of Parker Hannifin Corporation Packing Division.

(List continued on next page.)

*Primary Examiner*—Anthony Knight
*Assistant Examiner*—Mark A. Williams
(74) *Attorney, Agent, or Firm*—John A. Molnar, Jr.

(57) ABSTRACT

Fluid sealing system for installation within an assembly including a stationary machine part having a generally annular surface, and a reciprocable machine part having a generally cylindrical surface disposed concentrically with the annular surface of the stationary machine part. The system includes annular primary and secondary seal members each configured to be received within a corresponding gland of the annular surface coaxially intermediate the cylindrical surface of the movable machine part and a peripheral wall of the glands. The primary seal member has axially spaced-apart upper and lower end faces, and radially spaced-apart inner and outer diameter faces. The inner diameter face is formed to contact the cylindrical surface of the movable machine part along at least one dynamic sealing surface, and the outer diameter face is formed to contact the peripheral side wall of the gland along at least one static sealing surface. In turn, the upper end face is axially bifurcated into an inner portion and an outwardly-directed valving portion having an outer surface which defines the static sealing surface of the primary seal member. The valving portion is actuable responsive to fluid pressure developed intermediate the primary and secondary seal members to open a fluid passageway between the valving portion outer surface and the gland peripheral wall admitting the fluid pressure to an upstream, high pressure side of the assembly. Fluid communication is provided between the fluid pressure developed intermediate the primary and secondary seal members and the fluid passageway.

24 Claims, 7 Drawing Sheets

U.S. PATENT DOCUMENTS

| | | |
|---|---|---|
| 2,997,318 | 8/1961 | Lansky et al. . |
| 3,169,776 | 2/1965 | Felt . |
| 3,214,182 * | 10/1965 | Herbruggen .......................... 277/210 |
| 3,339,932 | 9/1967 | Maha . |
| 3,641,290 | 2/1972 | Millsap . |
| 3,790,179 | 2/1974 | Scannell . |
| 3,885,801 | 5/1975 | Scannell . |
| 3,921,991 | 11/1975 | Beck . |
| 3,942,806 | 3/1976 | Edlund . |
| 4,055,107 * | 10/1977 | Bartley ................................... 92/168 |
| 4,155,557 | 5/1979 | Grrebert . |
| 4,174,846 | 11/1979 | Scott . |
| 4,231,578 | 11/1980 | Traub . |
| 4,231,579 | 11/1980 | Scannell . |
| 4,268,045 | 5/1981 | Traub . |
| 4,328,072 | 5/1982 | Allbertson et al. . |
| 4,337,956 | 7/1982 | Hopper . |
| 4,417,503 | 11/1983 | Izumi . |
| 4,449,718 | 5/1984 | Miller . |
| 4,553,761 | 11/1985 | Blessing et al. . |
| 4,723,782 | 2/1988 | Muller . |
| 4,850,602 | 7/1989 | Goldstein et al. . |
| 4,889,349 | 12/1989 | Muller . |
| 4,893,823 | 1/1990 | Strouse et al. . |
| 4,953,876 | 9/1990 | Muller . |
| 5,104,131 | 4/1992 | Edlund et al. . |
| 5,139,274 * | 8/1992 | Oseman ................................. 277/58 |
| 5,143,382 | 9/1992 | Maringer et al. . |
| 5,169,160 * | 12/1992 | Gaskill et al. ......................... 277/68 |
| 5,171,027 | 12/1992 | Domkowski et al. . |
| 5,328,178 * | 7/1994 | Nies .................................... 277/205 |
| 5,431,415 | 7/1995 | Millonig et al. . |
| 5,472,216 | 12/1995 | Albertson et al. . |
| 5,482,296 | 1/1996 | Peppiatt et al. . |
| 5,553,872 | 9/1996 | Gies et al. . |

OTHER PUBLICATIONS

Article entitled Power–Seal Phase II Dual Lip Wiper. So Different, It's Patented.

Material entitled "Disogrin Rod Seals" of Freudenberg–NOK General Partnership Distribution Division, dated Aug., 1994.

Bulletin 5227—B1 of Parker Hannifin Corporatoin Packing Division entitled "User Guide Parker BT/BR Profile Rod Sealing System" dated 1996.

* cited by examiner

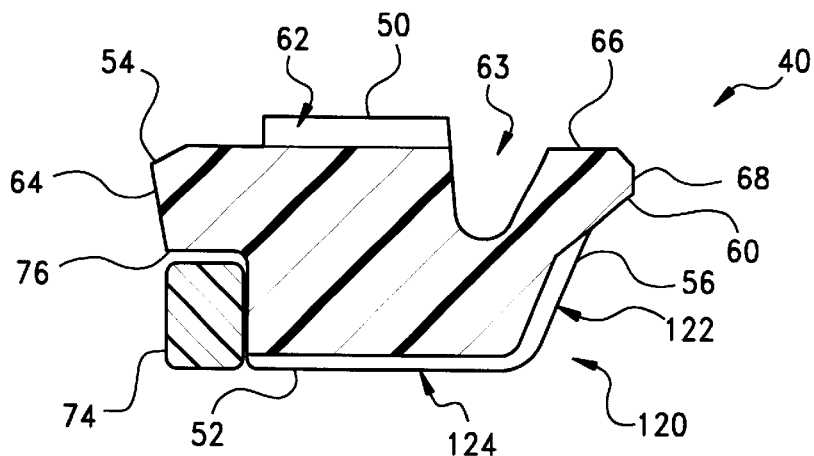
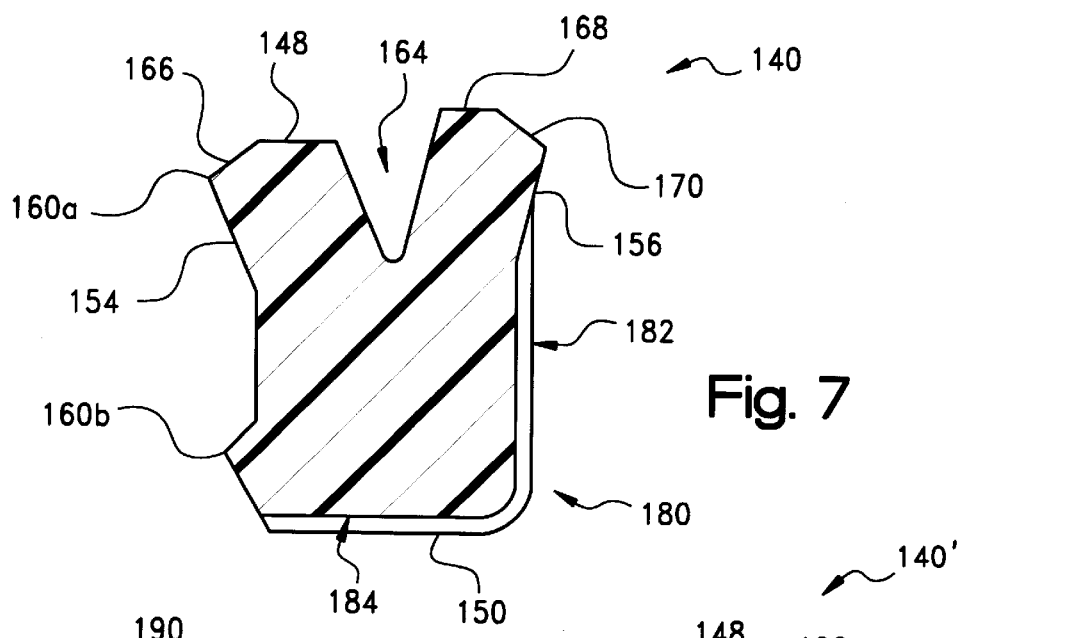
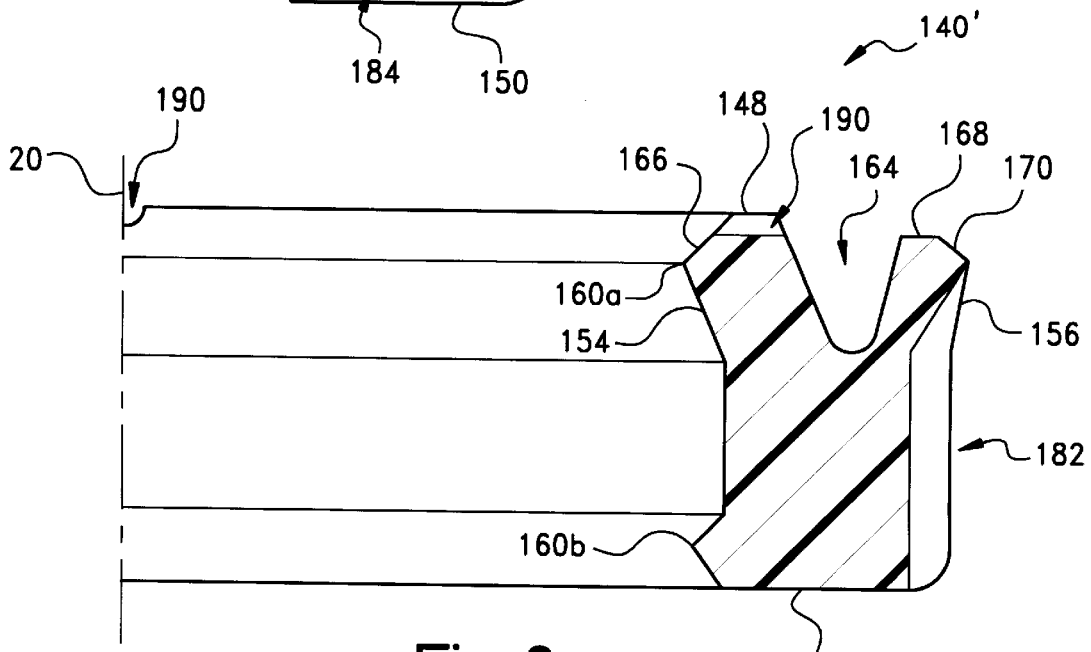

SEALING SYSTEM FOR A RECIPROCATING SHAFT

RELATED CASES

The present application claims priority to U.S. Provisional Application Serial No. 60/051,531, filed Jul. 2, 1997.

BACKGROUND OF THE INVENTION

The present invention relates broadly to packing rings and like seals for a reciprocating shaft such as the rod of a hydraulic or pneumatic cylinder or other actuator, and more particularly to a sealing system therefor which is engineered as having a check valving function to relieve fluid pressure developed between a primary and secondary seal member of the system.

Fluid seals, also known as packing rings, for machine part joints are well-known in the art. A typical application therefor involves the provision of a fluid seal intermediate relatively movable or reciprocating surfaces such as the outer surface of the rod of a hydraulic or pneumatic cylinder, or other fluid actuator, which reciprocates axially relative to an internal bore or other inner surface of a stationary, surrounding housing. Such seals, known in the vernacular as rod seals, conventionally are configured in a free state as a generally annular element which is molded or otherwise formed of an elastomeric or other resilient material such as a synthetic, natural, or co-polymer rubber, or a polymeric material such as a silicone, fluoropolymer, or, preferably, a polyurethane or fluoropolymer. Typically, the rod seal element is seated within an annular sealing gland which is provided within one of the surfaces, such as an internal bore of the cylinder housing, with the opening of the gland oriented as facing the other surface such as the outer surface of reciprocating rod. Within the gland, the seal is interposed between the rod, which is received coaxially through the seal for reciprocation within the cylinder bore, and a circumferential, peripheral side wall of the gland. As the piston rod reciprocates along a longitudinal axis within the bore, the seal functions to engage the reciprocating surface of the piston and the side wall of the gland to provide, respectively, a dynamic and static seal therebetween. In this regard, as installed under stress within the gland the seal presents in an energized or deformed state low and high pressure axial surfaces each disposed adjacent a corresponding side of the fluid pressure system, and inner and outer radial surfaces each defining one or more contact surfaces or "lips" with a corresponding, opposing surface of the rod and gland.

Ideally, a rod seal element should provide an effective sealing capability under static and dynamic conditions, at both low pressure, as the rod extends, and high pressures, as the rod retracts, with a minimum of static and dynamic friction for a long, maintenance-free service life. However, the seal must function not only to seal the rod against leakage, but also to wipe the rod of any liquid or other fluid film which may adhere to the outer surface thereof as the rod is extended outward of the packing gland and cylinder housing. Similarly, as the rod is retracted, it is desirable again wipe the rod to remove any contaminants therefrom which could damage the packing or which could be carried past the packing and into the cylinder. To provide these noted sealing and wiping functions, it is customary to separate wiping and sealing members in a series arrangement with the wiper mounted a spaced-apart axial distance downstream of the seal. In general configuration, the wiper member may include an elongate wiper arm for a large surface area contact with the outer surface of the rod. The seal member, in turn, may be configured as a U-cup having a low pressure side heel portion and a high pressure side axial surface which is asymmetrically bifurcated by a radially-extending channel to define, in a stressed orientation of the seal, an inner sealing lip for dynamic contact with the outer surface of the rod, and an outer sealing lip for static contact with the peripheral surface of the gland. Representative rod sealing and wiping elements are described in International Publication No. WO 92/15807 and in the following U.S. Pat. Nos.: 5,553,872; 5,482,296; 5,431,415; 5,143,382; 5,104,131; 4,935,876; 4,893,823; 4,889,349, 4,850,602; 4,723,782; 4,553,761; 4,449,718; 4,417,503; 4,337,956; 4,328,972; 4,268,045; 4,231,578; 4,174,846; 4,155,557; 3,942,806; 3,921,991; 3,790,1792,521,248; 3,339,932; 3,169,776; 2,997,318; 2,979,350; and 2,907,596. Commercial rod seals and wipers are manufactured, for example, by the following: Parker-Hannifin Corporation, Packing Division, Salt Lake City, Utah; Parker Hannifin GmbH, Prädifa Packing Division, Bietigheim-Bissingen, Fed. Rep. of Germany; Power-Seal Corporation; Freudenberg-NOK, Milan, Ohio; W.S. Shamban Co., Santa Monica, Calif.; Busak & Luyken GmbH & Co., Stuttgart, Fed, Rep. of Germany; Martin Merkel GmbH & Co. KG, Hamburg, Fed. Rep. of Germany; and Greene Tweed, Kulpsville, Pa.

An additional upstream element optionally may be provided as a buffer ring which is interposed between the U-cup and the high pressure side of the system. As the name implies, the buffer ring functions to protect the U-cup from shock loads, but also cooperates with the U-cup in sealing a majority of the fluid. Conventional buffer rings typically are formed as having a symmetrical, rectilinear cross-sectional profile.

It has been observed, however, that with buffer rings of a conventional configuration, problems can develop under severe operating conditions. For example, if the ring is too aggressive in sealing fluid, sufficient lubrication may not be provided to the rod. Excessive wear, increased frictional drag, and premature seal failure therefore can result. In contrast, if the buffer ring admits fluid only in one axial directional, that is, to the U-cup, during the extension stroke, fluid can become trapped between the buffer ring and the U-cup. During the retraction stroke of the rod, fluid pressure thereby may be developed between the ring and U-cup which can exceed the system pressure. This pressure which may exceed 400 bar, in turn, can cause both the U-cup and the ring to be extruded into the gap which is provided between the cylinder rod and housing. Of course, such extrusion represents an unacceptable condition in that subsequent rod stroke cycles can cause material to be abated from the U-cup or ring, resulting in the failure of the rod sealing system.

Recently, however, an improved buffer ring/U-cup arrangement has been introduced by Parker-Hannifin Corporation's Packing Division under the tradename "Parker BT/BR Profile Rod Sealing System." As is described by Swanson, R., in "OEM Off-Highway,"January 1995, the improved buffer ring profile includes an inside diameter which is formed as a solid, back-beveled sealing lip that provides dynamic sealing contact with the cylinder rod. As is in earlier designs, the solid sealing lip develops a sealing force against the rod and protects the fluid system from shock loads. The outside diameter, however, is uniquely formed to provide a dynamic, check valve portion for contact with the static side peripheral surface of the gland.

When energized by the fluid pressure developed between the buffer ring and the U-cup, the check valve portion is actuable to relieve the pressure back into the fluid system. Advantageously, the fluid pressure is vented around the less critical outside or static side diameter of the ring such that a constant, dynamic sealing contact may be maintained on the rod by the more critical inside diameter of the ring. Moreover, as the outside check valve portion in the subject ring is not subject to the reciprocating motion of the rod, that portion may be made smaller and thinner than if provided on the inside diameter of the ring to afford greater design flexibility and selection in the check valving function.

Another buffer ring design is described in U.S. Pat. No. 4,553,761 as having a radially-outside, statically-acting sealing lip for bearing on the housing groove, and a radially-inside, dynamically-acting sealing lip for bearing on the axially-displaceable surface of a piston rod. The axial spacing of the statically-acting sealing lip from the adjacent end face of the groove is provided to be greater than that of the dynamically-acting sealing lip. As a result, the movement of the rod in the direction of the sealing lips tilts the profile of the ring such that the end of the seal opposite the sealing lips is lifted away from the surface of the moving rod. Such lifting provides a pressure release whereby leakage liquid which is entrained by the moving rod and which possibly is accumulated in the space between the ring and a downstream seal is vent between the inside diameter of the ring and the rod back into the fluid system.

U.S. Pat. Nos. 4,723,782 and 4,953,876 disclose another arrangement for sealing between an axially-movable rod of a hydraulic device and a housing wall through which the rod moves. The arrangement includes an inner sealing ring and an outer stressing ring which are accommodated jointly within a groove of the housing wall such that the stressing ring contacts the sealing ring along a common contact face, with the sealing ring, in turn, contacting the rod under the force of the stressing ring. The sealing ring is provided on its inner surface which faces the rod with a pair of axially-offset sealing edges that define an annular space therebetween. Such space is connected with the outer surface of the sealing ring by an internal channel which extends from the inside diameter of the sealing ring to the outside diameter thereof to open at a point covered by the stressing ring which is located near the high-pressure end of the common contact face of the sealing and stressing rings. The channel and the stressing ring are stated to form a non-return valve which allows any fluid pressure that has entered the annular space to be relieved through the channel against the surface pressure developed on the outside diameter opening of the channel by the stressing ring. In this way, the pressure in the annular space may be controlled to limit leakage resulting from the outer sealing edge of the sealing ring being lifted from the surface of the rod.

U.S. Pat. No. 5,431,415 discloses a seal element for installation in an annular groove of a housing for a reciprocating rod. The seal element has a first radial surface that forms an acute heel with a first end surface of the groove. Upon the application of fluid pressure, the seal element is compressed into the groove such that the first radial surface of the element is moved into contact with the first end surface of the groove to prevent contamination from entering the static area. Angled surfaces on the inner and outer diameters of the element define high and low pressure sealing lines or lips for contact with a corresponding axial surface of the groove or rod. When low pressure conditions are applied to the element during the extension of the rod, the element rotates to close the heel angle providing an inner static area between the first radial surface of the seal element and the first end surface of the groove. When high pressure conditions are applied to the element during the retraction of the rod, the first radial surface of the element is maintained in continuous sealing engagement with the corresponding end surface of the groove. Contaminants thereby are excluded from the sealing groove during both high pressure and low pressure operation to maintain the integrity of the static seal developed between the seal element and the groove.

U.S. Pat. No. 4,337,956 discloses a sealing device for installation in a groove formed within one of an opposing pair of generally parallel surfaces. The sealing device includes a base member having bottom surface contours which define a pair of spaced-apart, longitudinally extending fluid passages between the base member and the groove. A pair of lip members are connected to the base member to extend therefrom for engagement with the other one of the confronting surfaces to thereby form another fluid passageway between the lip members and that surface. An internal channel is formed through the device to provide fluid communication between the base and lip member passages.

The demands placed on fluid power equipment, such as hydraulic cylinders and other actuators, by higher operating pressures, harsher service environments, and other conditions continue to increase. It therefore will be appreciated that further improvements in rod seals and sealing systems therefor would be well-received by the industry. Preferred improvements would enhance sealing performance by limiting fluid leakage and thereby reducing the potential for the introduction of contaminants into the fluid system.

BROAD STATEMENT OF THE INVENTION

The present invention is directed to an improved sealing system for a machine assembly having a reciprocating shaft such as the rod of a hydraulic or pneumatic cylinder or other actuator. The system includes at least a first primary seal member, such as a buffer ring or U-cup, and a secondary seal such as a U-cup or wiper member, each of which are received within a corresponding gland of a housing bore or the like through which the shaft extends for reciprocation along a longitudinal axis. For venting fluid pressure developed between the primary and secondary seal members, the primary seal member is configured to include a check valving portion which is actuable to admit fluid back into the high pressure side of the assembly system. Advantageously, a positive fluid communication pathway is maintained between the outside diameter of the primary seal member and the fluid pressure developed between the primary and secondary seal members to ensure that such pressure may be relieved by the action of the check valving portion. In a multi-seal arrangement wherein at least one intermediate seal member is disposed between the primary and secondary seal members, such intermediate member likewise may be configured as having a check valving portion with an associated fluid communication pathway for relieving fluid pressure developed between that member and the secondary seal member.

It therefore is a feature of a preferred embodiment of the present invention to provide a fluid sealing system for installation within an assembly including a stationary machine part having a generally annular surface, and a reciprocable machine part having a generally cylindrical surface disposed concentrically with the inner surface of the stationary machine part. The system includes annular primary and secondary seal members each configured to be received within a corresponding gland of the annular surface coaxially intermediate the cylindrical surface of the movable machine part and a peripheral wall of the glands. The primary seal member has axially spaced-apart upper and lower end faces, and radially spaced-apart inner and outer diameter faces. The inner diameter face is formed to contact the cylindrical surface of the movable machine part along at least one dynamic sealing surface, and the outer diameter face is formed to contact the peripheral side wall of the gland along at least one static sealing surface. In turn, the upper end face is axially bifurcated into an inner portion and an outwardly-directed valving portion having an outer surface which defines the static sealing surface of the primary seal member. The valving portion is actuable responsive to fluid pressure developed intermediate the primary and secondary seal members to open a fluid passageway between the valving portion outer surface and the gland peripheral wall admitting the fluid pressure to an upstream, high pressure side of the assembly. Fluid communication is provided between the fluid pressure developed intermediate the primary and secondary seal members and the fluid passageway.

It is a further feature of the preferred embodiment of the present invention to provide a method of sealing an assembly including a stationary machine part having a generally annular surface, and a reciprocable machine part having a generally cylindrical surface disposed concentrically with the inner surface of the stationary machine part. In accordance with the method, annular primary and secondary seal members each are received within a corresponding gland of the annular surface coaxially intermediate the cylindrical surface of the movable machine part and a peripheral wall of the glands. The primary seal member is provided as having has axially spaced-apart upper and lower end faces, and radially spaced-apart inner and outer diameter faces. The inner diameter face is formed to contact the cylindrical surface of the movable machine part along at least one dynamic sealing surface, and the outer diameter face is formed to contact the peripheral side wall of the gland along at least one static sealing surface. In turn, the upper end face is axially bifurcated into an inner portion and an outwardly-directed valving portion having an outer surface which defines the static sealing surface of the primary seal member. The valving portion is actuable responsive to fluid pressure developed intermediate the primary and secondary seal members to open a fluid passageway between the valving portion outer surface and the gland peripheral wall admitting the fluid pressure to an upstream, high pressure side of the assembly. In further accordance with the method of the invention, fluid communication is provided between the fluid pressure developed intermediate the primary and secondary seal members and the fluid passageway.

Advantages of the preferred embodiments of the present invention include an improved sealing system for a reciprocating shaft which ensures the relief of fluid pressure which may be sequentially developed between the respective sealing members of the system. Additional advantages is the provision of sealing system for hydraulic cylinder rods and the like which is particularly adapted for rigorous service. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 4 is a cross-sectional view of the primary seal member of the sealing system of FIG. 1 taken through the plane referenced at 4—4 in FIG. 2;

FIG. 7 is a cross-sectional view of the primary seal member of the sealing system of FIG. 5 taken through the plane referenced at 7—7 in FIG. 6;

FIG. 8 is a front view, in partial radial cross-section, of a segment of an alternative embodiment of the primary seal member of the sealing system of FIG. 5.

Figure 1:
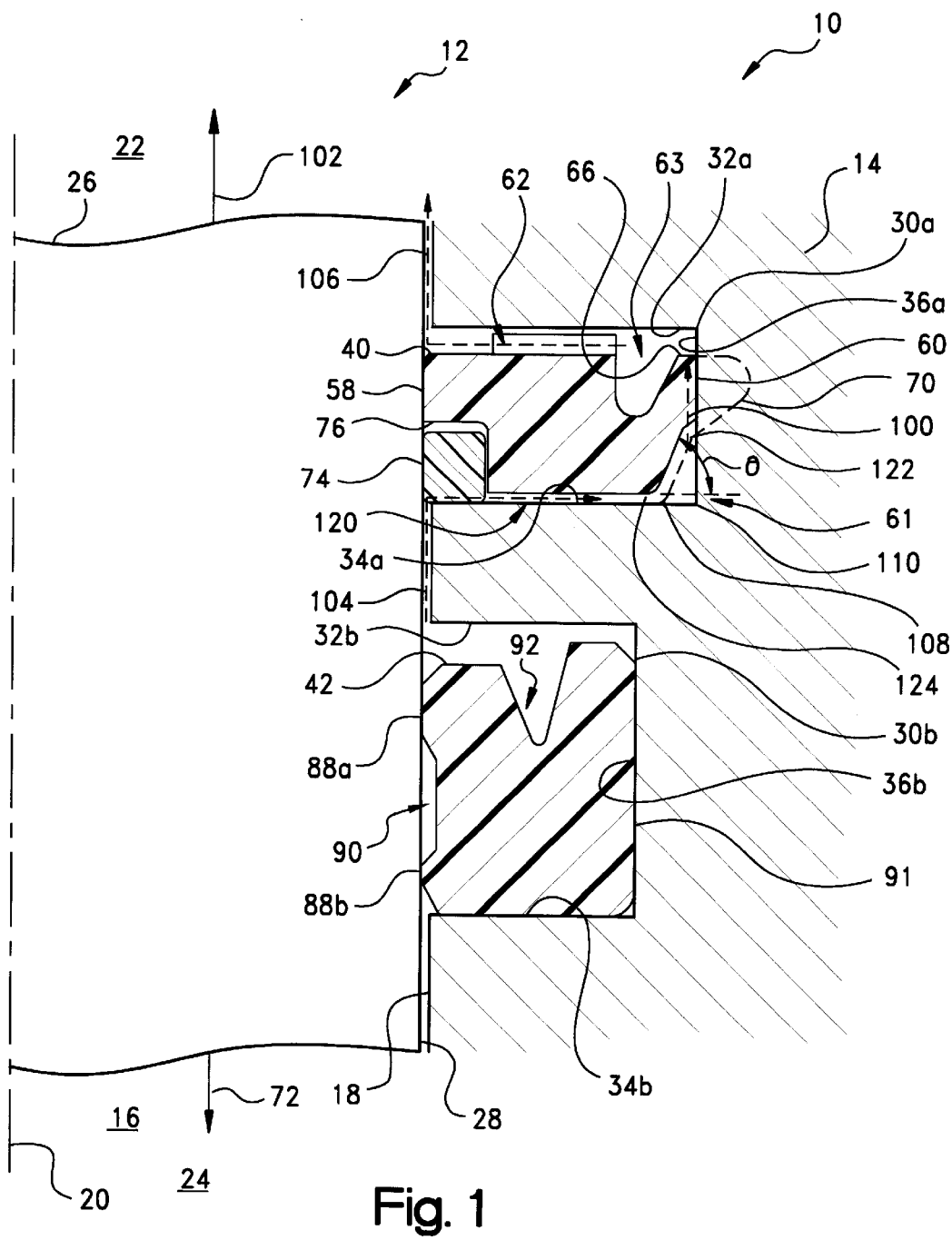
FIG. 1 is a partial view in longitudinal cross-section of a representative sealing system arrangement according to the present invention, which arrangement is shown as including a primary and secondary seal member installed within a fluid-powered assembly for sealing a reciprocating shaft thereof.

The drawings will be described further in connection with the following Detailed Description of the Invention

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions and surfaces perpendicular and parallel to the longitudinal central axis of the referenced element. Terminology of similar import other than the words specifically mentioned above likewise is to be considered as being used for purposes of convenience rather than in any limiting sense.

For the illustrative purposes of the discourse to follow, the precepts of the sealing system of the present invention are described in connection with the installation of the system within the housing bore of a double-acting hydraulic cylinder having a reciprocating piston rod or other like shaft. In view of the discourse to follow, however, it will be appreciated that aspects of the present invention may find utility in other fluid sealing applications wherein a movable machine part having a generally cylindrical surface is reciprocable or otherwise displaceable within a stationary machine part having a generally annular surface which is disposed in concentric opposition to the cylindrical surface to movable machine part. For example, the stationary machine part may be the cylinder bore and the movable machine part may be the piston head. Use within those such other applications therefore should be considered to be expressly within the scope of the present invention.

As is detailed further in, for example, U.S. Pat. No. 4,268,045, hydraulic cylinders of the variety herein involved conventionally include a cylindrical pressure vessel which is divided into a first and second chamber by a movable piston. Attached to the piston is an elongate piston rod which extends from the pressure vessel through the bore of a cylinder head or end cap. The piston rod, which may be connected to a load, is reciprocally positionable via hydraulic fluid pressure selectively admitted into the first or second chamber for effecting the linear translation of the piston within the pressure vessel. For example, fluid pressure may be supplied into the first chamber for extending the rod, or, alternatively, into the second chamber for retracting the rod.

As the rod is extended, a thin film of hydraulic fluid may viscously adhere to the outer surface and be transported by drag flow out of the cylinder assembly. Out of the cylinder, this film coalesces into droplets which are visible as fluid leakage. Moreover, as the rod is retracted, dirt and other contaminants may be entrained within the film and transported back into the hydraulic system. Therefore, to provide a fluid seal for the second chamber intermediate the outer surface of the rod and the inner surface of the cylinder head bore, the bore typically is formed as having one or more glands for receiving a corresponding seal member, such as a buffer ring, u-cup, and/or wiper. Such seals function both to prevent leakage around and along the rod of hydraulic fluid from the second chamber, and to exclude outside contaminants from being introduced into the fluid system.

Referring then to the figures wherein corresponding reference characters are used to designate corresponding elements throughout the several views, a representative sealing system arrangement according to the present invention, is shown generally at 10 as installed for service within a machine part assembly, referenced generally at 12, which may be a double-acting hydraulic cylinder. Cylinder assembly 12 conventionally includes a stationary housing part, 14, having a bore, 16, with an inner, generally annular surface, 18. Bore annular surface 18 extends along a central longitudinal axis, 20, intermediate an upstream high pressure side, 22, and a downstream low or atmospheric fluid pressure side, 24, of the assembly 12. Assembly 12 also includes a movable piston rod part, 26, having an outer, generally cylindrical surface, 28, which extends along axis 20 as disposed in concentric opposition to the annular surface 18 of the stationary housing part 14. Piston rod part 26 is reciprocable along axis 20 axis intermediate the high and low fluid pressure sides 22 and 24 of assembly 12.

For retaining the seal member constituents of system 10 of the invention, the annular surface 18 of bore 16 is formed as having at least an upstream first gland, 30*a*, and an axially spaced-apart, downstream second gland, 30*b*, respectively defined therein intermediate the high and low fluid pressure sides 22 and 24 of assembly 12. Each of glands 30 has axially spaced-apart upstream and downstream end walls, 32*a–b* and 34*a–b*, respectively, and a peripheral wall, 36*a–b*, extending therebetween radially circumferentially about the longitudinal axis 20.

In the representative arrangement shown for effecting a fluid seal intermediate the annular surface 18 of bore 16 and the cylindrical surface 28 of rod 26, sealing system 10 includes an upstream, primary seal member, 40, which may be provided as an annular buffer ring, and a downstream, secondary seal member, 42, which may be provided as an asymmetrical, dual sealing lip U-cup. Each of seal members 40 and 42 are configured to be received within a corresponding gland of the bore annular surface 16 coaxially intermediate the cylindrical surface 28 of the movable machine part and the peripheral wall 34*a* or 34*b* of the corresponding gland 30. Seal members 40 and 42 may be conventionally injection molded or otherwise formed of element which is molded or otherwise formed of an elastomeric material such as a synthetic or natural rubber, or a polymeric material such as a silicone, fluoropolymer, or a thermoplastic polyurethane which may be diphenylmethane diisocyanate (MDI)-based, tolidine diisocyanate (TODI)-based, or, preferably, the p-phenylenediisocyanate (PPDI)-based polyurethane which is marketed by the Packing Division of Parker-Hannifin Corporation, Salt Lake City, Utah, under the tradename "P4300™." As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Figure 2:
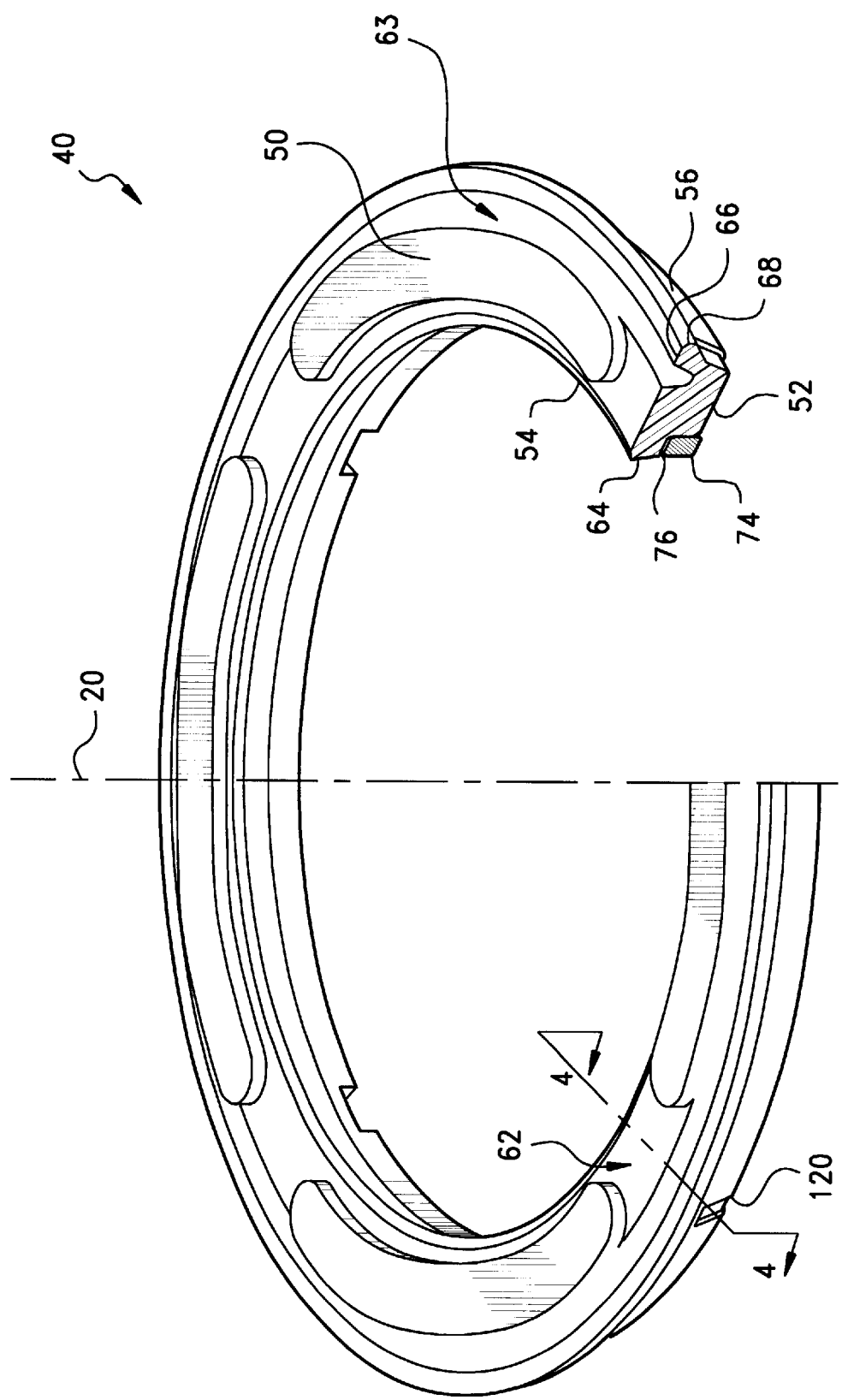
FIG. 2 is a perspective view, in partial radial cross-section, of the primary seal member of the sealing system of FIG. 1.

Looking additionally to FIG. 2, wherein a perspective view of primary seal member 40 is shown in an unstressed or free state, such member may be seen to include axially spaced-apart upper and lower end faces, 50 and 52, each disposable in confrontation with, respectively, the upstream and downstream end walls 32*a* and 34*a*, of first gland 30*a*, and radially spaced-apart inner and outer diameter faces, 54 an 56. Inner diameter face 54 is formed to contact the cylindrical surface 28 of movable machine part 26 along at least one dynamic sealing surface, shown at 58 in FIG. 1, with the outer diameter face, in turn, being formed to contact the peripheral side wall 36*a* of first gland 30*a* along at least one static sealing surface, 60. Preferably, the outer diameter face is tapered to extend radially inwardly from the upper end face 50 to the lower end face 52 to define a predetermined flare angle, referenced at θ in FIG. 1, which typically is between about 10°–40°, and associated static area, 61, with the peripheral surface 36*a* of first gland 30*a*.

In the illustrated embodiment, the upper end face 50 of primary seal member 40 is formed as including a plurality of equally radially spaced-apart recesses or slots, one of which is referenced at 62, each extending intermediate the inner and outer diameter faces 54 and 56. The end face 50 further is asymmetrically bifurcated by a radially circumferentially extending groove, 63, into an inner axial portion, 64, and an outwardly-directed valving portion, 66, having an outer surface, 68, which defines the static sealing surface 60 of the seal member. Such asymmetrical bifurcation provides, as may be seen in FIG. 1, for the installation of the seal member 40 within gland 30 as pre-loaded under an initial stress which is distributed over sealing surfaces 58 and 60. That is, within gland 30*a*, seal member 40 is deformed from an initial or free state, which is superimposed in phantom at 70, to an energized or installed state wherein the outer surface 68 of valving portion 66 thereof is normally biased in an abutting contact with the peripheral surface 36*a* of groove 30*a* to defined static sealing surface 60. During the extension stroke of rod in the direction referenced at 72, valving portion 66 is further energized by positive fluid directed from the high pressure side 22 on groove 63.

Optionally, an annular backup ring, 74, having a generally polygonal cross-sectional geometry may be coaxially received in gland 30*b* with primary seal member 40. As primary seal member 40 may be axially compressed by fluid pressure and/or the reciprocating movement of rod 26, back-up ring 74 may be provided to delimit the extrusion of seal member 40 into the clearance gap between the opposing surfaces 18 and 28 of bore 16 and rod 26 which accommodates for the reciprocating axial movement of the rod through the bore. In this regard, back-up ring 74 is interposed between an undercut portion, 76, of the inner diameter face 54 thereof and the cylindrical surface 28 of the rod. As compared to seal member 40, backup ring 70 conventionally is formed of a relatively harder, tougher, and more rigid thermoplastic material, such as a filled or unfilled nylon, an acetal polymer such as Delrin® (Du Pont, Wilmington, Del.), polybutylene terephthalate (PBT), polyetherketone (PEK) or the like.

Figure 3:
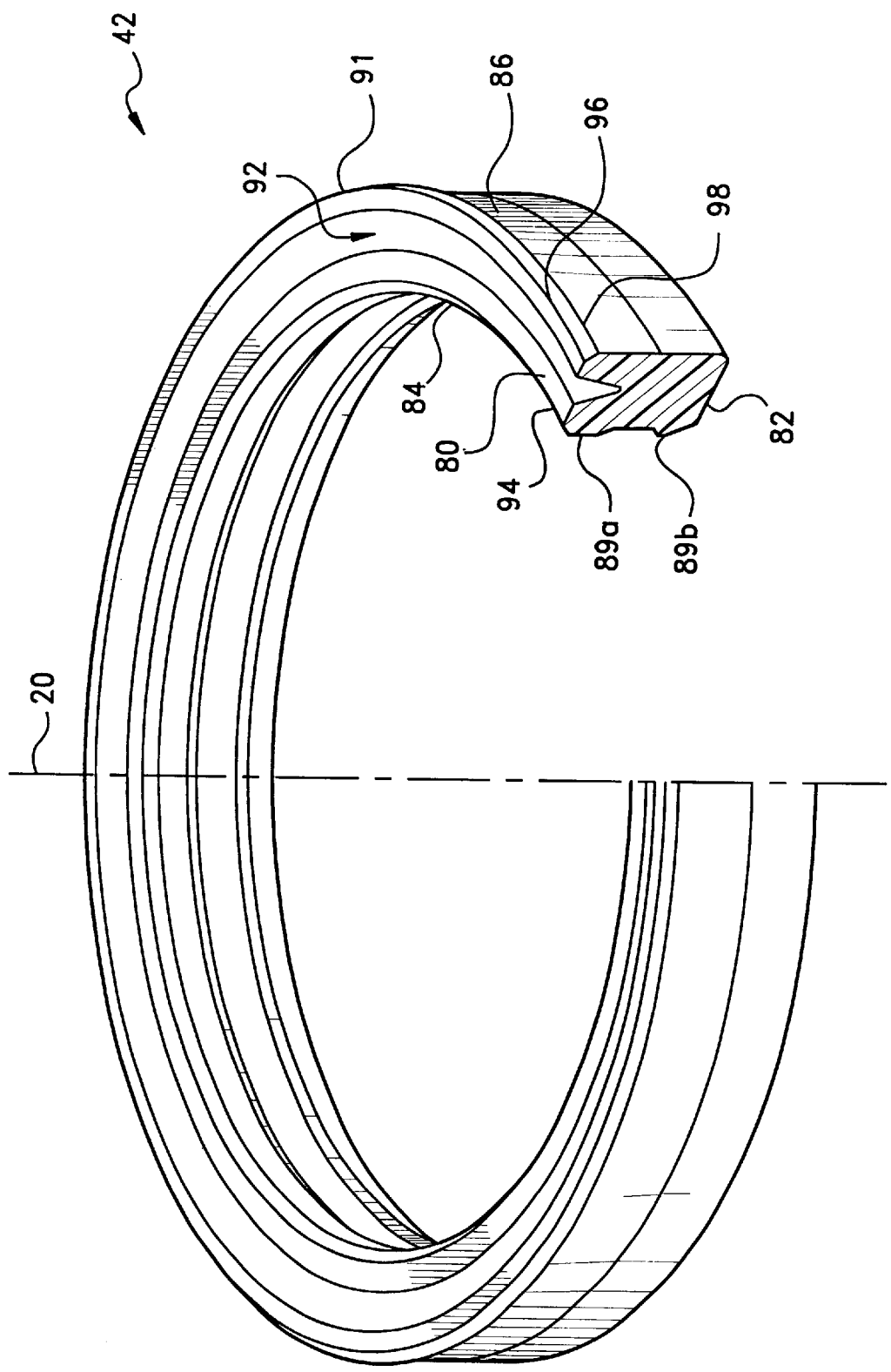
FIG. 3 is a perspective view, in partial radial cross-section, of the secondary seal member of the sealing system of FIG. 1.

Returning to FIG. 1 and looking additionally to FIG. 3, wherein a perspective view of secondary seal member 42 is shown in an unstressed or free state, such member may be seen likewise to include axially spaced-apart upper and lower end faces, 80 and 82, each disposable in confrontation with, respectively, the upstream and downstream end walls 32b and 34b, of second gland 30b, and radially spaced-apart inner and outer diameter faces, 84 and 86. Inner diameter face 84 is formed to contact the cylindrical surface 28 of movable machine part 26 along a pair of axially spaced-apart, dynamic sealing surfaces, shown at 88a–b in FIG. 1, which are defined, respectively, on a pair of radially inwardly-extending sealing lips or edges, shown at 89a–b in FIG. 3. Advantageously, sealing edges 89 define a fluid reservoir, referenced at 90 in FIG. 1, therebetween which retains a fluid supply for lubricating the outer surface 28 of rod 23. Outer diameter face 86, in turn, is formed to contact the peripheral side wall 36b of second gland 30b along a static sealing surface, 91. As was upper end face 50 of primary seal member 40, the upper end face 80 likewise is asymmetrically bifurcated by a radially circumferentially extending recess, 92, into an inner axial portion or leg, 94, and an outer axial portion or leg, 96, having an outer surface, 98, which defines the static sealing surface 91 of the seal member 42. Such asymmetrical bifurcation again provides for the installation of the seal member 42 within gland 30b under an initial stress which is distributed over sealing surfaces 88 and 90 to firmly seat the seal within the gland.

In accordance with the present invention, valving portion 66 is actuable responsive to fluid pressure developed intermediate the primary and secondary seal members 40 and 42 to open a pressure relief passageway, referenced in phantom at 100 in FIG. 1, which is defined between the outer surface 68 of the valving portion and the peripheral wall 36a of first gland 30a . That is, as rod 26 is extended in the direction referenced at 72, a thin, lubricating film of fluid is carried downstream on the rod outer surface 28 past the dynamic sealing surface 58 of the primary seal member 40. At least a portion of this film is removed from the surface of the rod by sealing surface 88a of the secondary seal member 42 to collect interstitially between the seal members. As rod 26 is retracted in the direction referenced at 102, the collected fluid may be pressurized to greater than system pressure. When energized by this fluid pressure, valving portion 66 is responsive to exhibit a radially inward flexure opening passageway 100 in the manner of a one-way check valve for the venting of the pressure back upstream into the system through radial, recesses 62 via the fluid flow path designated by arrows 104, 100, and 106.

It has been observed experimentally, however, that in smaller hydraulic cylinders, i.e., cylinders having nominal rod diameters of about 1¼ to about 2-inch, the above-described checking valving feature exhibits a time lag as compared to its operation in larger size cylinders. For example, testing has revealed that in smaller cylinders, fluid pressure trapped between the primary and secondary seal members is relieved after about 30 minutes, while in larger size cylinders the pressure is relieved after only about 30 seconds. In this regard, it is speculated that in seals for smaller size rods, geometric constraints limit the provision of a relatively steep flare angle θ. Conditions therefore may occur wherein the heel portion, referenced at 108 in FIG. 1, of primary seal member 40 can become compressed into the corner, 110, of gland 30a effectively filling the static area 61 and thereby partially blocking the pressure relief passageway 100.

Particularly to improve, then, the performance of sealing system 10 for smaller cylinders and the like, primary seal member 40 is configured in accordance with the precepts of the present invention to ensure that positive fluid communication is provided between the fluid pressure developed intermediate the seal members and the pressure relief passageway 100. In the preferred embodiment shown in FIG. 2, such fluid communication is provided by means a plurality of peripheral channels, one of which is referenced at 120, which are equally spaced-apart radially about the outer diameter face 56 preferably in fluid communication registration with a corresponding recess 62. As may be seen best in the cross-sectional view of primary seal member 42 depicted in FIG. 4, each of peripheral channels 120 may include an axial channel portion, 122, formed into the outer diameter face as extending intermediate lower end face 52 and the static sealing surface 60 defined by the valving portion outer surface 68, and a corresponding radial channel portion, 124, formed into the lower end face 52 as extending from the undercut portion 76 of the inner diameter face 54 into fluid communication with the corresponding axial channel portion 122.

Looking again to FIG. 1, it may be appreciated that the provision of peripheral channels 120 advantageously ensures positive fluid communication between the fluid pressure developed intermediate the primary and secondary seal members and the pressure relief passageway 100 opened by the action of valving portion 66. That is, and irrespective of any compression of the seal heel portion 108 into the corner 110 of the gland, the integrity of the fluid flow path designated by arrows 104, 100, and 106 is maintained for the proper operation of the check valving function.

Figure 5:
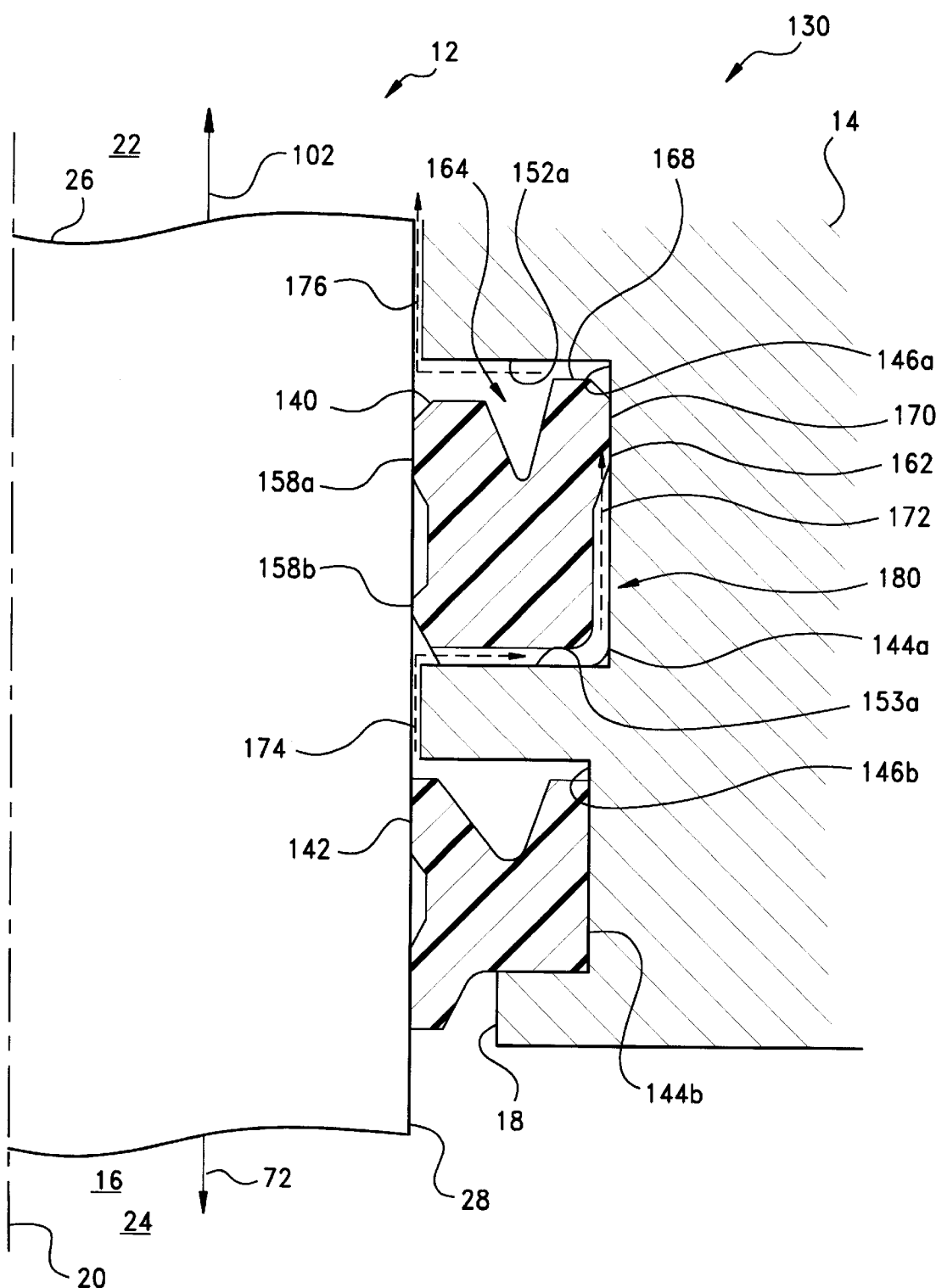
FIG. 5 is a partial installation view in longitudinal cross-section of another representative sealing system arrangement, including primary and secondary seal members, according to the present invention.

Turning next to FIG. 5, an alternative arrangement of sealing system 10 of the present invention is shown at 130 again to includes an upstream, primary seal member, 140, which now is provided as an asymmetrical, dual sealing lip U-cup, and a downstream, secondary seal member, 142, which now is provided as annular wiper. Each of seal members 140 and 142 are configured to be received within a corresponding gland 144a or 144b of the bore annular surface 16 coaxially intermediate the cylindrical surface 28 of the movable machine part and the peripheral wall 146a or 146b of the corresponding gland.

Figure 6:
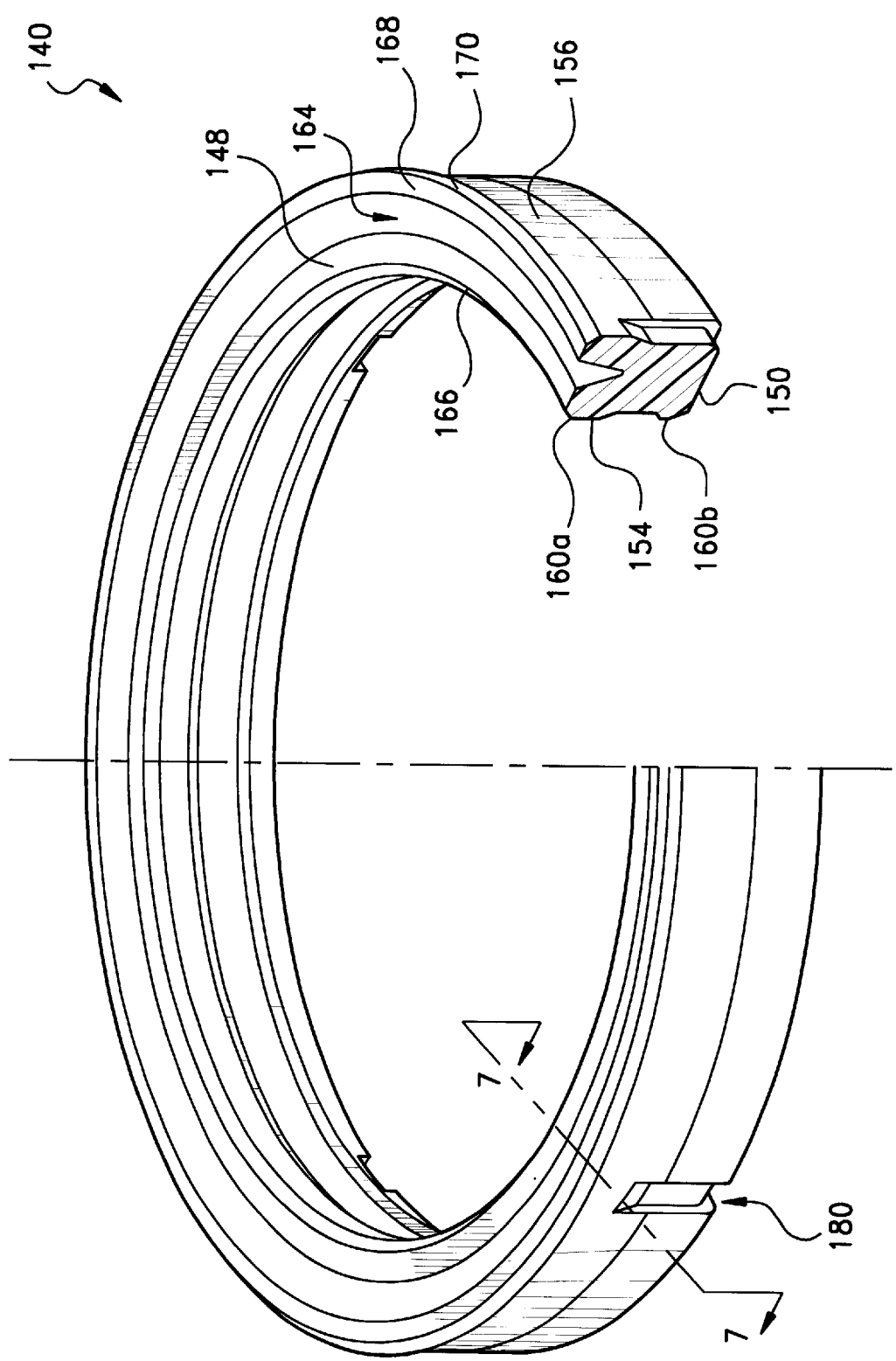
FIG. 6 is a perspective view, in partial radial cross-section, of the primary seal member of the sealing system of FIG. 4.

As with the U-cup described in connection with the secondary seal element 42, and as may be seen in the perspective, free-state view of FIG. 6, primary seal member 140 likewise includes axially spaced-apart upper and lower end faces, 148 and 150, and radially spaced-apart inner and outer diameter faces, 154 and 156. Upper and lower end faces 148 and 150 each are disposable in confrontation with, respectively, the upstream and downstream end walls 152a and 153a of the gland 144a . Inner diameter face 154 again is formed to contact the cylindrical surface 28 of movable machine part 26 along a pair of axially spaced-apart, dynamic sealing surfaces, shown at 158a–b in FIG. 5, which are defined, respectively, on a pair of radially inwardly-extending sealing lips or edges, shown at 160a–b in FIG. 6.

Outer diameter face 156, in turn, is formed to contact the peripheral side wall 146a of gland 144a along a static sealing surface, 162. The upper end face 150 is asymmetrically bifurcated by a radially circumferentially extending recess, 164, into an inner axial portion, 166, and an outwardly-directed valving portion, 168, having an outer surface, 170, which defines the static sealing surface 162 of the seal member 140. As before, valving portion 168 is actuable responsive to fluid pressure which is developed intermediate the primary and secondary seal members 140 and 142 to open a pressure relief passageway, referenced in phantom at 172 in FIG. 5, which is defined between the outer surface 170 of the valving portion and the peripheral wall 146a of gland 144a for the venting of the pressure back upstream into the system via the fluid flow path designated by arrows 174, 172, and 176.

As was the buffer ring 40 of system 10, the U-cup 140 of system 130 similarly is configured in accordance with the precepts of the present invention to ensure that positive fluid communication is provided between the fluid pressure developed between the seal members and the pressure relief passageway 172. In the preferred embodiment shown in FIG. 6, such fluid communication again is provided by means a plurality of peripheral channels, one of which is referenced at 180, which are equally spaced-apart radially about the outer diameter face 156. As may be seen best in the cross-sectional view of 7, each of peripheral channels 180 may include an axial channel portion, 182, formed into the outer diameter face as extending intermediate lower end face 150 and the static sealing surface 162 defined by the valving portion outer surface 170, and a corresponding radial channel portion, 184, formed into the lower end face 150 as extending from the inner diameter face 154 into fluid communication with the corresponding axial channel portion 182. Looking again to FIG. 5, it again may be appreciated that the provision of peripheral channels 180 advantageously ensures positive fluid communication between the fluid pressure developed intermediate the primary and secondary seal members and the pressure relief passageway 172 opened by the action of valving portion 168.

Referring next to FIG. 8, an alternative embodiment of seal member 140 is shown at 140'. Seal 140' is configured as having only axial channel portions 182, and as further including a plurality of equally radially spaced-apart recesses or slots, commonly referenced at 190, each extending intermediate the inner and outer diameter faces 154 and 156. As with slots 62 of seal member 40 (FIG. 2), the axial channel portions 182 preferably are equally spaced-apart radially about the outer diameter face 156 as aligned in fluid communication registration with a corresponding recess 190.

Figure 9:
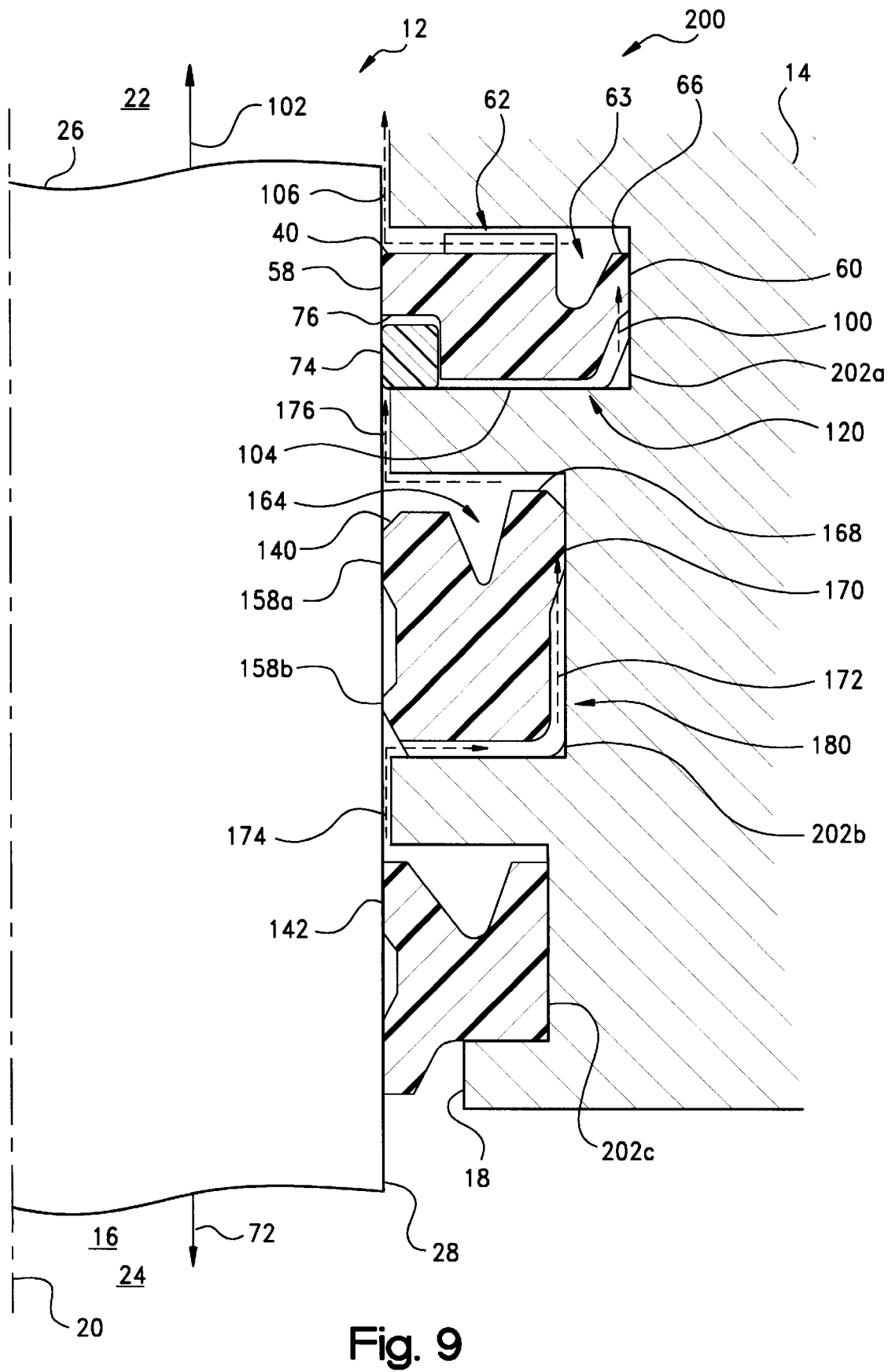
FIG. 9 is a partial installation view in longitudinal cross-section of another representative sealing system arrangement, including primary, secondary, and tertiary seal members, according to the present invention.

Turning lastly to FIG. 9, another alternative arrangement of sealing system 10 of the present invention is shown at 200 as including a primary, secondary, and tertiary seal member, each of which are configured to be received within a corresponding gland 202a, 202b, or 202c of the bore annular surface 16. In a preferred embodiment of system 200, the primary seal member is provided as the buffer ring 40 of the present invention which was described in connection with FIG. 3, the secondary seal member is provided as the U-cup 140 of the invention which was described in connection with FIG. 6, and the tertiary seal member is provided as a conventional wiper such as the wiper 142 of FIG. 5. In such an arrangement, the seal members are cooperatively associated to vent, successively, downstream fluid pressure which is developed intermediate the secondary and tertiary seal members, and which is developed intermediate the primary and secondary seal members. That is, with peripheral channels 180 being provided within secondary seal member 140, the valving portion 168 thereof is actuable responsive to fluid pressure which is developed intermediate the secondary and tertiary seal members to open pressure relief passageway 172 for the venting of the pressure upstream via the fluid flow path designated by arrows 174, 172, and 176. In turn, with peripheral channels 120 being provided within primary seal member 40, valving portion 66 thereof is actuable responsive to fluid pressure, include the pressure vented by the secondary seal member, which is developed intermediate the primary and secondary seal members to open a pressure relief passageway 100 for the venting of that pressure upstream via the fluid flow path designated by arrows 104, 100, and 106.

It is anticipated that certain changes may be made in the present invention without departing from the precepts herein involved. Accordingly, the foregoing description should be interpreted as illustrative and not in a limiting sense. All references cited herein are expressly incorporated by reference.

What is claimed is:

1. A fluid sealing system for installation within an assembly including a stationary machine part having a generally annular surface which extends along a central longitudinal axis intermediate an upstream high and a downstream low fluid pressure side of the assembly, and a movable machine part having a generally cylindrical surface disposed in concentric opposition to the annular surface of the stationary machine part, the movable machine part being reciprocable along the central longitudinal axis intermediate the high and low fluid pressure sides of the assembly, and the annular surface of the stationary machine part having at least an upstream first gland and an axially spaced-apart, downstream second gland respectively defined therein intermediate the high and low fluid pressure sides of the assembly, the first and second gland each having axially spaced-apart upstream and downstream end walls and a peripheral wall extending therebetween radially circumferentially about the longitudinal axis, said system comprising:

a generally annular secondary seal member configured to be received within the second gland coaxially intermediate the cylindrical surface of the movable machine part and the peripheral wall of the second gland;

a generally annular primary seal member configured to be received within the first gland coaxially intermediate the cylindrical surface of the movable machine part and the peripheral wall of the first gland, said primary seal member having axially spaced-apart first upper and lower end faces disposable in confrontation with, respectively, the upstream and downstream end walls of the first gland, and radially spaced-apart first inner and outer diameter faces, said first inner diameter face being formed to contact the cylindrical surface of the movable machine part along at least one dynamic sealing surface, and the first outer diameter face being formed to contact the peripheral side wall of the first gland along at least one static sealing surface, said first upper end face having a first inner portion and an outwardly-directed first valving portion including a first outer surface which is normally biased within the first gland in abutting contact with the peripheral surface thereof to define the static sealing surface of said primary seal member, said first valving portion being actuable responsive to a first fluid pressure developed intermediate said primary and said secondary seal member to open a first fluid passageway between the first outer surface of said first valving portion and the peripheral wall of the first gland admitting said first fluid pressure to the upstream high pressure side of said assembly; and one or more first peripheral channels for providing fluid communication between said first fluid pressure developed intermediate said primary and said secondary seal member and said first fluid passageway, each of said first peripheral channels coupling said first fluid passageway in fluid communication with said first fluid pressure and including a first axial channel portion formed into the first outer diameter face of said primary seal member to extend intermediate the first lower end face thereof and the static sealing surface of said first valving portion.

2. The fluid sealing system of claim 1 wherein said first upper end face of said primary seal member is axially bifurcated by a radially circumferentially extending recess into said first inner portion and said first valving portion.

3. The fluid sealing system of claim 1 wherein a plurality of said first peripheral channels are equally spaced-apart radially about the first outer diameter face of said primary seal member.

4. The fluid sealing system of claim 1 wherein said first upper surface face of said primary seal member is formed as having one or more radial recesses each extending intermediate the first inner and outer diameter faces thereof as disposed in fluid communication registration with a corresponding one of said first peripheral channels.

5. The fluid sealing system of claim 1 wherein each of said first peripheral channels further comprises a first radial channel portion formed into the first lower end face of said primary seal member to extend from the first inner diameter face thereof into fluid communication with a corresponding said first axial channel portion.

6. The fluid sealing system of claim 1 wherein the annular surface of the stationary machine part further has a third gland defined therein intermediate the second gland and the low fluid pressure side of the assembly as having axially spaced-apart upstream and downstream end walls and a peripheral wall extending therebetween radially circumferentially about the longitudinal axis, and wherein said system further comprises a generally annular tertiary seal member configured to be received within the third gland coaxially intermediate the cylindrical surface of the movable machine part and the peripheral surface of the third gland.

7. The fluid sealing system of claim 6 wherein said secondary seal member is formed as having axially spaced-apart second upper and lower end faces disposable in confrontation with, respectively, the upstream and downstream end walls of the second gland, and radially spaced-apart second inner and outer diameter faces, said second inner diameter face being formed to contact the cylindrical surface of the movable machine part along at least one dynamic sealing surface, and the second outer diameter face being formed to contact the peripheral side wall of the second gland along at least one static sealing surface, said second upper end face having a second inner portion and an outwardly-directed second valving portion including a second outer surface which is normally biased within the second gland in abutting contact with the peripheral surface thereof to define the static sealing surface of said secondary seal member, said second valving portion being actuable responsive to a second fluid pressure developed intermediate said secondary and said tertiary seal member to open a second fluid passageway between the second outer surface of said second valving portion and the peripheral wall of the second gland admitting said second fluid pressure intermediate said secondary and said primary seal member, and wherein said system further comprises one or more second peripheral channels for providing fluid communication between said second fluid pressure developed intermediate said secondary and said tertiary seal member and said second fluid passageway, each of said second peripheral channels coupling said second fluid passageway in fluid communication with said second fluid pressure and including a second axial channel portion formed into the second outer diameter face of said secondary seal member to extend intermediate the second lower end face thereof and the static sealing surface of said second valving portion.

8. The fluid sealing system of claim 7 wherein said second upper end face of said secondary seal member is axially bifurcated by a radially circumferentially extending recess into said second inner portion and said second valving portion.

9. The fluid sealing system of claim 7 wherein each of said second peripheral channels further comprises a second radial channel portion formed into the second lower end face of said secondary seal member to extend from the second inner diameter face thereof into fluid communication with a corresponding said second axial channel portion.

10. The fluid sealing system of claim 1 wherein the first outer diameter face of said primary seal member extends radially inwardly from said upper face surface to said lower face surface to define a predetermined flare angle with the peripheral surface of the first gland.

11. The fluid sealing system of claim 10 wherein said flare angle is about 10° to about 40°.

12. The fluid sealing system of claim 1 further comprising a generally annular backup element configured to be received coaxially with said primary seal member in the first gland as interposed between a portion of the first inner diameter face of said primary seal member and the cylindrical surface of the movable machine part.

13. A method of sealing an assembly including a stationary machine part having a generally annular surface which extends along a central longitudinal axis intermediate an upstream high and a downstream low fluid pressure side of the assembly, and a movable machine part having a generally cylindrical surface disposed in concentric opposition to the annular surface of the stationary machine part, the movable machine part being reciprocable along the central longitudinal axis intermediate the high and low fluid pressure sides of the assembly, and the annular surface of the stationary machine part having at least an upstream first gland and an axially spaced-apart, downstream second gland respectively defined therein intermediate the high and low fluid pressure sides of the assembly, the first and second gland each having axially spaced-apart upstream and downstream end walls and a peripheral wall extending therebetween radially circumferentially about the longitudinal axis, said method comprising the steps of:

(a) receiving a generally annular secondary seal member within the second gland coaxially intermediate the cylindrical surface of the movable machine part and the peripheral wall of the second gland;

(b) receiving a generally annular primary seal member within the first gland coaxially intermediate the cylindrical surface of the movable machine part and the peripheral wall of the first gland, said primary seal member having axially spaced-apart first upper and lower end faces disposable in confrontation with, respectively, the upstream and downstream end walls of the first gland, and radially spaced-apart first inner and outer diameter faces, said first inner diameter face being formed to contact the cylindrical surface of the movable machine part along at least one dynamic sealing surface, and the first outer diameter face being formed to contact the peripheral side wall of the first gland along at least one static sealing surface, said first upper end face having a first inner portion and an outwardly-directed first valving portion including a first outer surface which is normally biased within the first gland in abutting contact with the peripheral surface thereof to define the static sealing surface of said primary seal member, said first valving portion being actuable responsive to a first fluid pressure developed intermediate said primary and said secondary seal member to open a first fluid passageway between the first outer surface of said first valving portion and the peripheral wall of the first gland admitting said first fluid pressure to the upstream high pressure side of said assembly; and (c) providing a first means of fluid communication between said first fluid pressure developed intermediate said primary and said secondary seal member and said first fluid passageway, said first means comprising one or more peripheral channels each coupling said first fluid passageway in fluid communication with said first fluid pressure and including a first axial channel portion formed into the first outer diameter face of said primary seal member to extend intermediate the first lower end face thereof and the static sealing surface of said first valving portion.

14. The method of claim 13 wherein said first upper end face of said primary seal member is axially bifurcated by a radially circumferentially extending recess into said first inner portion and said first valving portion.

15. The method of claim 13 wherein a plurality of said first peripheral channels are equally spaced-apart radially about the first outer diameter face of said primary seal member.

16. The method of claim 13 wherein said first upper surface face of said primary seal member is formed as having one or more axial recesses each extending intermediate the first inner and outer diameter faces thereof as disposed in fluid communication registration with a corresponding one of said first peripheral channels.

17. The method of claim 13 wherein each of said first peripheral channels further comprises a first radial channel portion formed into the first lower end face of said primary seal member to extend from the first inner diameter face thereof into fluid communication with a corresponding said first axial channel portion.

18. The method of claim 13 wherein the annular surface of the stationary machine part further has a third gland defined therein intermediate the second gland and the low fluid pressure side of the assembly as having axially spaced-apart upstream and downstream end walls and a peripheral wall extending therebetween radially circumferentially about the longitudinal axis, and wherein said method further comprises the additional step (d) of receiving a generally annular tertiary seal member within the third gland coaxially intermediate the cylindrical surface of the movable machine part and the peripheral surface of the third gland.

19. The method of claim 18 wherein said secondary seal member is formed as having axially spaced-apart second upper and lower end faces disposable in confrontation with, respectively, the upstream and downstream end walls of the second gland, and radially spaced-apart second inner and outer diameter faces, said second inner diameter face being formed to contact the cylindrical surface of the movable machine part along at least one dynamic sealing surface, and the second outer diameter face being formed to contact the peripheral side wall of the second gland along at least one static sealing surface, said second upper end face having a second inner portion and an outwardly-directed second valving portion including a second outer surface which is normally biased within the second gland in abutting contact with the peripheral surface thereof to define the static sealing surface of said secondary seal member, said second valving portion being actuable responsive to a second fluid pressure developed intermediate said secondary and said tertiary seal member to open a second fluid passageway between the second outer surface of said second valving portion and the peripheral wall of the second gland admitting said second fluid pressure intermediate said secondary and said primary seal member, and wherein said method further comprises the additional step (e) of providing second means of fluid communication between said second fluid pressure developed intermediate said secondary and said tertiary seal member and said second fluid passageway, said second means comprising one or more peripheral channels each coupling said second fluid passageway in fluid communication with said second fluid pressure and including a second axial channel portion formed into the second outer diameter face of said primary seal member to extend intermediate the second lower end face thereof and the static sealing surface of said second valving portion.

20. The method of claim 19 wherein said second upper end face of said secondary seal member is axially bifurcated by a radially circumferentially extending recess into said second inner portion and said second valving portion.

21. The method of claim 19 wherein each of said second peripheral channels further comprises a second radial channel portion formed into the second lower end face of said secondary seal member to extend from the second inner diameter face thereof into fluid communication with a corresponding said second axial channel portion.

22. The method of claim 13 wherein the first outer diameter face of said primary seal member extends radially inwardly from said upper face surface to said lower face surface to define a predetermined flare angle with the peripheral surface of the first gland.

23. The method of claim 22 wherein said flare angle is about 10° to about 40°.

24. The method of claim 13 further comprising the additional step of receiving a generally annular backup element coaxially with said primary seal member in the first gland as interposed between a portion of the first inner diameter face of said primary seal member and the cylindrical surface of the movable machine part.

* * * * *